Nov. 5, 1974 R. H. CLARKE 3,846,202
METHOD FOR MAKING REINFORCED FLEXIBLE TUBING
Filed May 30, 1972 2 Sheets-Sheet 1

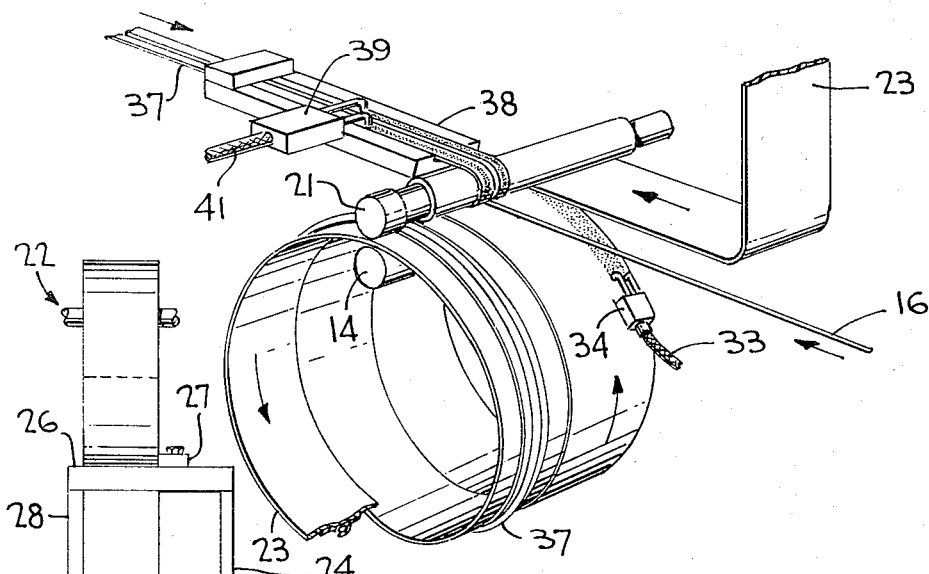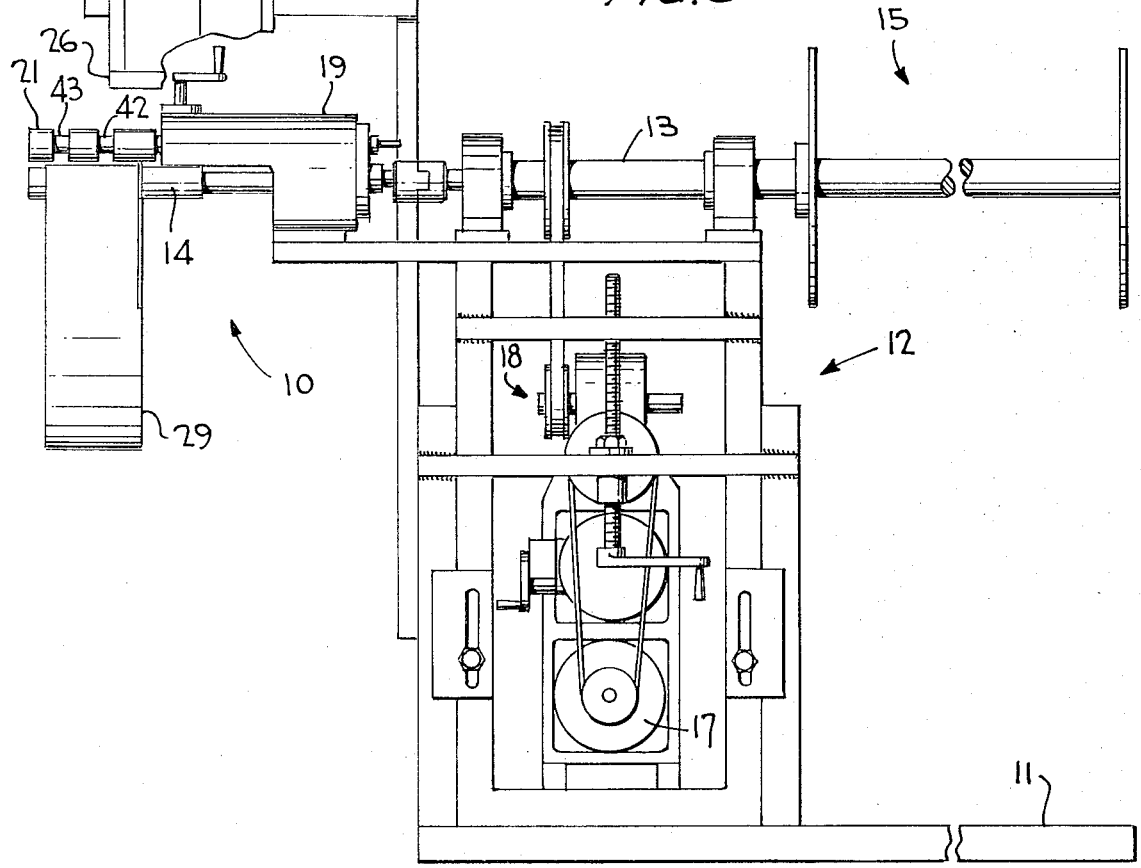

United States Patent Office 3,846,202
Patented Nov. 5, 1974

3,846,202
METHOD FOR MAKING REINFORCED
FLEXIBLE TUBING
Robert H. Clarke, Warsaw, Ind., assignor to American
Brattice Cloth Corporation, Winona Lake, Ind.
Filed May 30, 1972, Ser. No. 257,878
Int. Cl. B31c 13/00
U.S. Cl. 156—143                6 Claims

ABSTRACT OF THE DISCLOSURE

A reinforced flexible tubing is produced from an elongated tape fed through one tape guide and about a tape guide means to form a spirally wound tape having overlapping side portions with means being provided for adhesively securing the overlapping side portions together. A reinforcing wire is continuously fed on to the outer surface and along the central area of the first tape loop so formed, and a wear strip is thereafter continuously secured in place over the reinforcing wire.

---

This invention relates generally to a method and apparatus for making reinforced flexible tubing and more particularly to such a method and apparatus for more effectively producing tubing from a spirally wound tape having a continuous reinforcement and a wear strip continuously secured thereover between the side edges of each tape convolution.

The need for more efficient ventilation in confined areas has created a need for higher air pressures, and this in turn has placed an increased strain on ventilation tubing. Conventional spiral wire supported tubing operating under these conditions of increased pressures is subject to failure due to collapse or shearing, the latter condition arising when opposite sides of the tubing move transversely in opposite directions, thereby resulting in an undesirable closing of the tubing either partially or totally. In addition to this problem during use of conventional tubing, structural failure of the tubing frequently occurs because of the degradable types of adhesives which may be used that are not capable of withstanding the effects of prolonged exposure to the sun and weather elements.

In order to produce a stronger and more durable wire reinforced tubing, a departure from conventional processes and conventional designs has been made. Accordingly, an apparatus and technique has been devised for effectively producing a flexible wire reinforced tubing from a spirally wound flexible tape having a continuous wire reinforcement and wear strip thereover which is adhesively secured in a continuous manner approximately centrally of the opposite edges of each tape convolution, in a simple, practical and highly economical manner. Also, a polyester or the equivalent is used as a bonding agent for both adhesively securing the overlapped side portions of each tape convolution and for securing the wear strip in place, thereby avoiding the possibility of degradation of the adhesive securing means.

The support or reinforcement for the spiral wire tubing is, of course, the wire helix so that the fabric or tape between the spiral loops has no support as in the prior art designs which normally provide the wire reinforcement at or near the side edges of each tape convolution. Therefore, by placing a bonded seam on the tape between the helical wire loops additional support is provided for the completed tubing. This additional support will increase the tube resistance to collapse and shearing to a greater degree as compared to tubing made by conventional methods. The placement of the seam as above described will reduce parting tension stresses on the seam as compared to placement of the seam at the reinforcement wire which makes it subject to bending stresses instead of pure shear for which the adhesive is best suited.

It is therefore the principal object of the present invention to provide a method and apparatus for producing a flexible wire reinforced tubing which will be resistant to collapse and shearing and which will withstand the effects of exposure to sun and the weather elements, in a simple, efficient and economical manner.

Another object of this invention is to provide such a method whereby an elongated tape is fed about a tube forming guide to form a series of spirally wound tape convolutions having overlapping side portions whereafter these side portions are adhesively secured together, and elongated reinforcing wire is continuously fed on to the outer surface of the tape along its central area after which an elongated wear strip is continuously fed and adhesively secured in place over the reinforcing wire.

A further object of this invention is to provide such a method wherein the tape and wire and the wear strip are continuously fed at the same time by a common feed means.

A still further object of this invention is to provide an apparatus for the production of a reinforced flexible tubing from a spirally wound elongated tape wherein a tube forming means is provided for forming a series of tape convolutions overlapping along their sides, with means also being provided for feeding the tape about the forming means as well as for feeding a reinforcing wire on to the outer surface of the tape central area. The feed means moreover serves to feed an elongated wear strip in place over the reinforcing wire and means are provided for adhesively securing the overlapped side portions together and for adhesively securing the wear strip in place.

Other objects, advantages and novel features of the present invention will become apparent from the following description of the invention when taken in conjunction with the accompanying drawings, wherein:

FIG. 4 is a perspective view of a part of the apparatus of FIG. 1 showing the manner in which the reinforced flexible tubing is made; and FIG. 5 is a front elevational view of the apparatus of FIG. 1.

Figure 1:
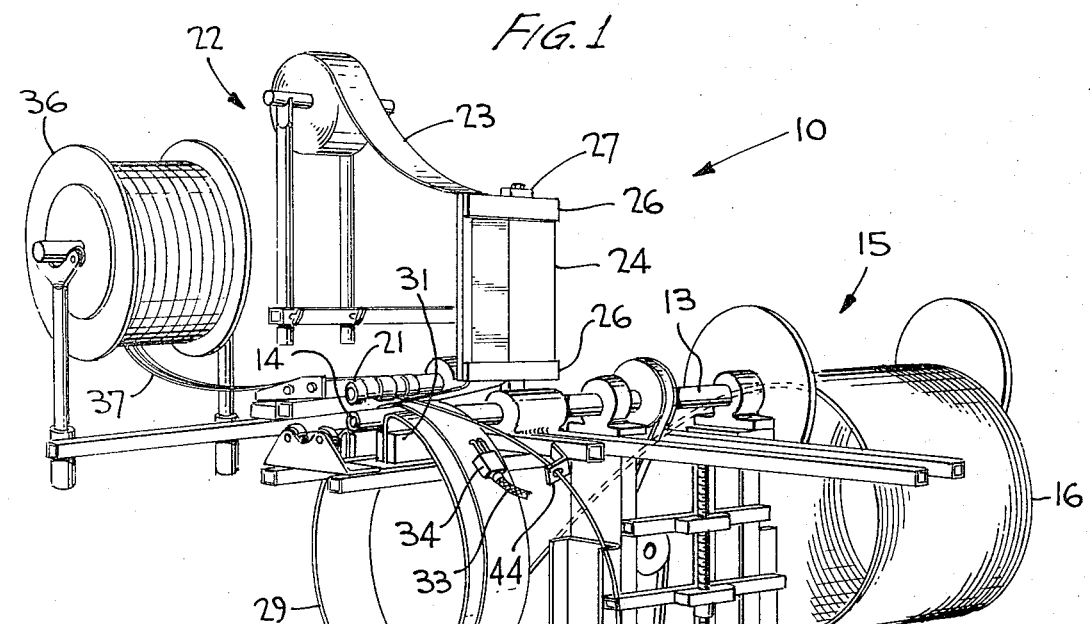
FIG. 1 is a perspective view showing the apparatus in accordance with the present invention for making the reinforced flexible tubing.

Turning now to the drawings wherein like reference characters refer to like and corresponding parts throughout the several views, the assembled apparatus is shown in FIG. 1, generally designated 10, and is structurally mounted on a support base 11 by means of a support bracing assembly 12 on which a rotable main shaft 13 is supported, as shown in FIGS. 1 and 5, between its ends. At one end of shaft 13, a bonding and feed roll 14 is provided and a storage reel 15 is provided at the opposite end, end shaft 13, for the purpose of supporting and unreeling an elongated coiled reinforcing wire 16 during the course of the tube making operation. The main shaft 13 is powered by a variable speed drive motor 17 through a gear reducer and belt system 18. A gear box 19 having conventional gear wheels therein is operatively connected with shaft 13 to transmit the rotation thereof to another feed and bonding roll 21.

The apparatus 10 further includes a storage reel means 22 provided for storing a reel of thin flexible tape material 23. As can be seen in FIGS. 1 and 5, the tape material 23 is fed through a vertically disposed tape guide 24 between a rear plate 25 and forward bars 26 thereof having cutouts for accommodating the tape; the tape guide also being provided with laterally adjustable means 27 which bears against one edge of the tape and maintains the other edge thereof in contact with the cutouts of bars 26.

Figure 2A:
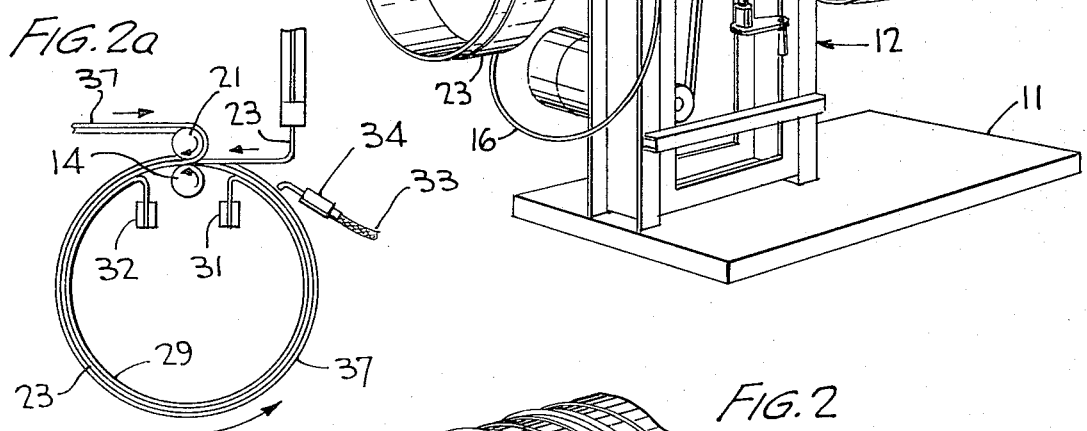
FIG. 2a is an end elevational view of the tubing being formed about a tape guide.
Figure 2:
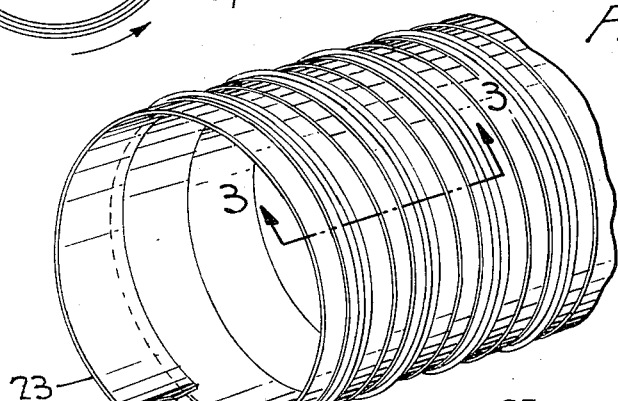
FIG. 2 is a perspective view showing a portion of the reinforced flexible tubing made from the apparatus of FIG. 1.

After the tape material 23 is fed through the tape guide 24, as above described, the leading end thereof is fed between feed rolls 14 and 21 and about the outer surface of a spiral tape guide 29 in such a manner whereby the leading end of the tape again is fed between the feed rolls 14 and 21 (see FIG. 2a) thereby manually completing the first convolution of the tape to be ultimately formed into a spirally wound flexible tube. The free ends of the tape guide 29 are conveniently mounted in place as at 31, 32, located on the opposite sides of the feed rolls 14, 21, as clearly shown in FIG. 2a.

A heated bonding agent of polyester is fed from a supply source (not shown) in any normal manner through a conduit 33 and into a nozzle unit 34 having conventional nozzles thereon for directing the bonding agent on to the outer surface of the first tape convolution near the rearward edge thereof. It should be noted that a heater means (not shown) is provided either at the bonding agent supply source or at the unit 34 for heating the bonding agent to make it sufficiently fluid for bonding purposes. As the feed rollers 14, 21 continue to rotate in the direction of the arrows shown in FIG. 2a, second and subsequent tape convolutions are formed with edges thereof in overlapping relationship and bonded to one another by means of unit 34 as shown at 35 in FIG. 3.

Figure 3:
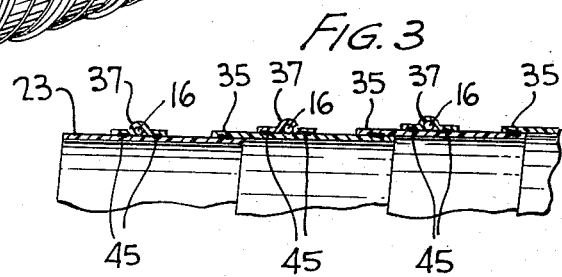
FIG. 3 is a sectional view of the tubing taken along the line 3—3 of FIG. 2.

The apparatus in accordance with the present invention further includes a storage reel 36 conveniently mounted in any normal manner for storing a reel of elongated wear strip material 37 of vinyl or similar type material. As can be seen in FIG. 3 of the drawings, the wear strip 37 is "omega" shaped in cross-section. It is unreeled from reel 36 to be guided along a wear strip guide 38 with its underside facing upwardly as shown in FIG. 4. A bonding agent similar to the type described for bonding together the overlapping side edges of the tape material is fed from a source (not shown) through a conduit 41 and into a nozzle unit 39 having a pair of standard nozzles mounted thereon for directing a quantity of bonding material on to the underside of each flange of the wear strip which is supported by the wear strip guide 38. After the first tape convolution is manually formed as described above and shown in FIG. 2a, the wear strip 37 is manually fed about the top feed roll 21 over approximately 180 degrees of its circumference and between the nip of the rolls to overlie the outer surface of the tape at the start of the first tape convolution. The wear strip 37 is guided by means of a peripheral groove 42 on roll 21 (see FIG. 5) so as to be properly made to lie approximately centrally of each tape convolution between opposite ends of the tape.

Before the wear strip is bonded in place, the elongated reinforcing wire 16 is directed toward the nip of rolls 14, 21 and through a guide bracket 44 mounted in place as shown in FIG. 1. The leading end of reinforcing wire 16 is, of course, manually directed toward the roll nip to lie within and to be guided by the central groove of the wear strip 37 so that, upon rotation of the rolls 21 and 14, both the reinforcing wire and the wear strip are fed in place by the feed rolls along the outer surface of each tape convolution to be bonded thereto as at 45, shown in FIG. 3.

Another peripheral groove 43 is provided near the free end of upper feed roll 21 (see FIG. 5) for the purpose of guiding the wear strip 37 and reinforcing wire 16 which it covers along the first tape convolution as it moves outwardly along the feed rolls during formation of the flexible tubing. Of course, as the flexible tubing is so formed, it may become necessary to provide a mandrel or some type of elongated rod to support the tubing along its length.

From the foregoing, it can be seen that an apparatus is provided for making a reinforced flexible tubing wherein the tape material is fed through the tape guide 24 and about the tube forming guide 29 so that the leading end of the tape material is first manually fed to lie between the nip of feed rollers 14 and 21. An elongated wearstrip material 37 is fed with its underside facing upwardly along a guide 38 and manually inserted between the nip of feed rolls 14, 21 to overlie the beginning of the first tape convolution between its ends. A peripheral groove 42 on the upper feed roller 21 assures the central location of the wearstrip 37 on the tape material. The overlapping end portions of the tape, as it is wound by the feed rollers 14, 21, are conveniently and effectively bonded to one another and the wearstrip is likewise bonded in place over the reinforcing wire. By such a technique, reinforced flexible tubing is produced faster than by sewing together the overlapped edges and the wearstrip in place and, by reason of the polyester bonding agent used herein, the tubing which is formed is more resistant to aging, as compared to other types of flexible tubing wherein degradable bonding agents or cements are used. Moreover, fewer stresses are created at the tape seams with the type of bonding agent and the technique used herein which assures that the entire overlapped edges of the tape convolutions are bonded to one another, thereby avoiding loose flaps at the overlap and thereby also creating a non-directional air flow type of tubing.

Obviously, many modifications and variations of the present invention are possible in the light of the above teachings. It is therefore to be understood that within the scope of the appended claims, the invention may be practiced otherwise than as specifically described.

What is claimed is:

1. A method of making reinforced flexible tubing comprising the steps of:
   feeding an elongated tape about a tube forming guide to form a series of spirally wound tape convolutions having overlapping side portions;
   adhesively securing together said overlapping side portions after the first one of said convolutions is first formed;
   continuously feeding an elongated reinforced wire on to the outer surface of said tape inwardly of the opposite overlapping side portions thereof after said first tape convolution is so formed;
   continuously feeding an elongated wearstrip in place over said reinforcing wire; and adhesively securing said wearstrip on to said outer surface of said tape.

2. The method according to claim 1 wherein said tape and said wire are continuously fed at the same time by a common feed means.

3. The method according to claim 1 wherein the tape is first fed through a tape guide which assures that each of the tape convolutions will be in overlapping relationship with one another.

4. The method according to claim 1 wherein said wire and said wearstrip are fed initially toward one another whereafter said wearstrip is fed in place along the same direction as said wire.

5. The method according to claim 4 wherein the underside of said wearstrip faces upwardly during the initial feeding thereof.

6. The method according to claim 5 wherein adhesive is applied to said wearstrip underside before securing it in place on to said outer surface of said tape.

References Cited

UNITED STATES PATENTS

| | | | |
|---|---|---|---|
| 3,536,559 | 10/1970 | Pelley et al. | 156—429 |
| 2,625,979 | 1/1953 | Harris et al. | 156—431 |

(Other references on following page)

UNITED STATES PATENTS

| | | | |
|---|---|---|---|
| 2,707,017 | 4/1955 | Beare et al. | 156—195 |
| 3,018,212 | 1/1962 | Chinn | 156—195 |
| 3,401,073 | 9/1968 | Wood | 156—429 |
| 3,336,172 | 8/1967 | Hall et al. | 156—429 |
| 2,405,909 | 8/1946 | Smith et al. | 156—171 |
| 3,548,724 | 12/1970 | Hall | 156—195 |
| 3,240,645 | 3/1966 | Friedwald et al. | 156—195 |
| 3,607,517 | 9/1971 | Pelley et al. | 156—195 |
| 3,563,826 | 2/1971 | O'Neil, Jr. | 156—190 |
| 3,311,523 | 3/1967 | Carpenter et al. | 156—429 |
| 2,798,508 | 7/1957 | Kahn | 156—195 |

CHARLES E. VAN HORN, Primary Examiner

B. J. LEWRIS, Assistant Examiner

U.S. Cl. X.R.

156—171, 173, 190, 192, 195; 138—129, 138